United States Patent
Xia

(10) Patent No.: US 10,796,025 B2
(45) Date of Patent: Oct. 6, 2020

(54) METHOD FOR CONTROLLING AN ELECTRONIC DEVICE AND AN ELECTRONIC DEVICE

(71) Applicant: Lenovo (Beijing) Limited, Beijing (CN)

(72) Inventor: Hong Cheng Xia, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 152 days.

(21) Appl. No.: 15/476,748

(22) Filed: Mar. 31, 2017

(65) Prior Publication Data

US 2017/0286722 A1 Oct. 5, 2017

(30) Foreign Application Priority Data

Mar. 31, 2016 (CN) .......................... 2016 1 0201688

(51) Int. Cl.
*G06F 21/74* (2013.01)
*G06F 21/31* (2013.01)
*G06F 1/16* (2006.01)

(52) U.S. Cl.
CPC ............ *G06F 21/74* (2013.01); *G06F 1/1615* (2013.01); *G06F 21/31* (2013.01)

(58) Field of Classification Search
CPC ......... G06F 21/74; G06F 21/31; G06F 1/1615
See application file for complete search history.

(56) References Cited

U.S. PATENT DOCUMENTS

| | | | | |
|---|---|---|---|---|
| 5,956,656 A * | 9/1999 | Yamazaki | ............. | G08B 5/228 340/7.55 |
| 2006/0250320 A1 * | 11/2006 | Fuller | .................. | G06F 1/1616 345/1.1 |
| 2014/0013454 A1 * | 1/2014 | Berger | .................. | G06F 1/3287 726/35 |
| 2014/0055387 A1 * | 2/2014 | Yeh | ....................... | G06F 3/0488 345/173 |
| 2014/0215201 A1 * | 7/2014 | Pfeifer | .................. | G06F 1/1652 713/100 |
| 2014/0320393 A1 * | 10/2014 | Modarres | ............... | G06F 3/017 345/156 |
| 2014/0355195 A1 * | 12/2014 | Kee | ....................... | G06F 1/1616 361/679.27 |
| 2015/0062025 A1 | 3/2015 | Lee et al. | | |
| 2015/0271206 A1 * | 9/2015 | Schultz | ............... | G06F 21/6236 726/3 |
| 2016/0054799 A1 * | 2/2016 | Levesque | ................ | G06F 3/041 345/173 |

(Continued)

FOREIGN PATENT DOCUMENTS

| | | |
|---|---|---|
| CN | 103136479 A | 6/2013 |
| CN | 103297606 A | 9/2013 |
| CN | 104301117 A | 1/2015 |

*Primary Examiner* — Vance M Little
(74) *Attorney, Agent, or Firm* — Kunzler Bean & Adamson

(57) ABSTRACT

A method, electronic device, and a program product are disclosed. The method may include providing an electronic device formable to at least one form state. The method may include determining the form state of the electronic device. The method may include determining a security level corresponding to the form state. The method may include operating the electronic device in the security level. The electronic device and program product may include similar features.

20 Claims, 2 Drawing Sheets

(56) References Cited

U.S. PATENT DOCUMENTS

2016/0191528 A1* 6/2016 McMurtry ............ G06F 21/335
                                                        726/4
2017/0147805 A1* 5/2017 Ichikawa ................ G06F 21/34

* cited by examiner

METHOD FOR CONTROLLING AN ELECTRONIC DEVICE AND AN ELECTRONIC DEVICE

FIELD

The subject matter disclosed herein relates to the field of electronic technologies and in particular to a method and electronic device for controlling an electronic device.

BACKGROUND

Deformable electronic devices may include various form states and various interactions with users. However, deformable electronic devices follow the security management methods of non-deformable devices. This hinders the exploitation of deformable electronic devices' various advantages.

SUMMARY

In one embodiment, a method is disclosed. In one embodiment, the method may include providing an electronic device formable to at least one form state. The method may include determining the form state of the electronic device. The method may include determining a security level corresponding to the form state. The method may include operating the electronic device in the security level.

In one embodiment, an electronic device is disclosed. The electronic device may include a determining unit. The determining unit may be configured to determine a form state of the electronic device. The electronic device may be formable to at least one form state. The electronic device may include a processor. The electronic device may include a memory. The memory may store code executable by the processor. The code executable by the processor may include code to determine a security level corresponding to the form state. The code executable by the processor may include code to operate the electronic device in the security level.

In one embodiment, a computer program product is disclosed. The program product may include a non-transitory computer readable storage medium. The storage medium may store code executable by a processor. The executable code may include code to perform determining the form state of an electronic device. The electronic device may be formable to at least one form state. The executable code may include code to perform determining a security level corresponding to the form state. The code may include code to perform operating the electronic device in the security level.

Other embodiments of the method, electronic device, and program product are also disclosed.

BRIEF DESCRIPTION OF THE DRAWINGS

To describe the technical solutions according to the embodiments of the present invention or the technical solutions in the related art more clearly, accompanying drawings used for describing the embodiments are hereinafter briefly introduced. It is apparent that the accompanying drawings hereinafter are only intended to illustrate some embodiments of the present application.

DETAILED DESCRIPTION

The present disclosure is described in detail with reference to the accompanying drawings and specific embodiments. It should be understood that the embodiments of the present application and the specific features in the embodiments are used to describe the present disclosure and are not intended to limit the present disclosure. The embodiments of the present application may be combined with each other so long as they do not conflict.

The electronic device in one or more embodiments of the present disclosure may include a deformable device. The electronic device may include a tablet computer, smartphone, smartglasses, smartwatch, virtual or augmented Reality device, or the like.

The deformability of an electronic device may be achieved in one or more the following manners. In one embodiment, an electronic device may include one or more deformable panels. A deformable panel may be made of deformable material such that the electronic device may change part or all of its form by changing the form of the one or more deformable panels. In some embodiments, an electronic device may include a mechanical piece for driving deformation. As an example, an electronic device may include a rotation shaft. A first part of the electronic device may rotate around a second part to change the form of the electronic device.

In certain embodiments, a user may change the form state of a deformable electronic device by applying a force to the electronic device or by activating an electrical control. For example, an electronic device may provide a preset current into the panel made of a deformable material. In response, the current may cause the panel made of the deformable material to deform. As another example, an electronic device may include an electrical motor. The electronic device may power up the electrical motor. In response, the electrical motor may drive a mechanical piece of the electronic device to displace to deform the electronic device.

Figure 1:
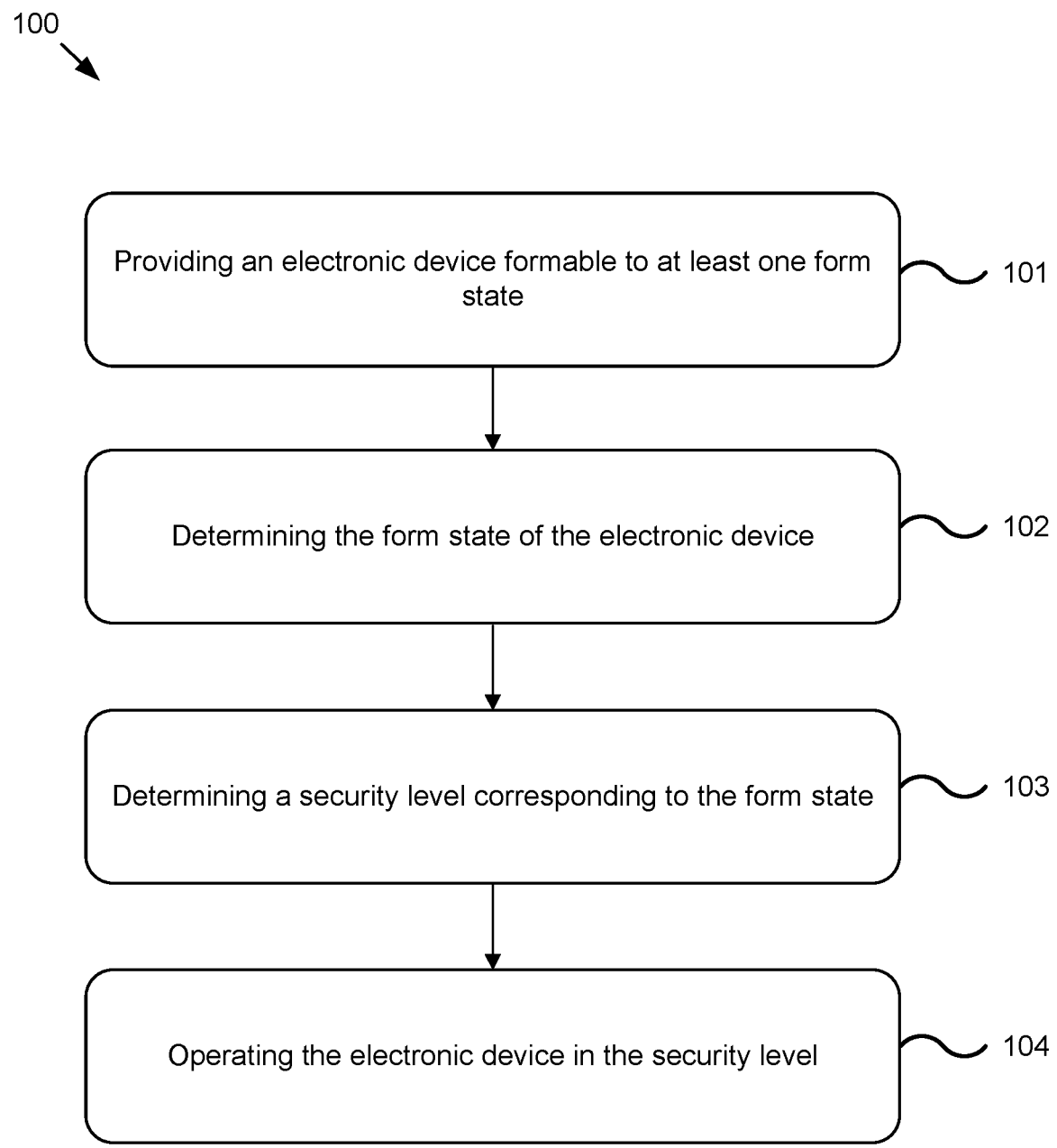
FIG. 1 is a schematic flow diagram depicting one embodiment of a method.

FIG. 1 depicts one embodiment of a method 100. The method 100 may control an electronic device. The method 100 may include one or more of the following steps.

Step 101 Providing an electronic device formable to at least one form state. The electronic device may be formable to at least one form state as described above. In one embodiment, the electronic device may be formable to at least one form state in a different manner.

Step 102 Determining the form state of the electronic device.

In some embodiments, an electronic device may determine its form state in a variety of ways. In one embodiment, an electronic device may include a deformable panel. In response to the electronic device being in different form states, electrical parameters of the deformable panel may be different. The electronic device may determine its current form state based on the electrical parameter by detecting the electrical parameter of the deformable panel.

For example, in one embodiment, the electrical parameter may include an electrical resistance value. In different form states a deformable panel may include an electrical resistance value in different ranges. For example, certain electrical resistance values may correspond to different form states of the electronic device. The electronic device may determine the form state of the deformable panel based on the detected electrical resistance being within a certain range. For example, 0-20 ohms may correspond to a first form state, 21-30 ohms may correspond to a second form state, and 31 or more ohms may correspond to a third form state.

In one embodiment, an electronic device may include a sensor. The sensor may include one or more sensors. In response to the electronic device being in different form states, the sensor may detect different values. For example, the sensor may be positioned at a bendable portion of the electronic device. The sensor may detect the tension force of the bendable portion of the electronic device. The sensor may detect different tension forces in response to the bendable portion being in a planar state, a bent state, or the like. In response to the tension force detected by the sensor, the electronic device may determine whether its bendable portion is planar or bent.

In some embodiments, an electronic device may include an image capture unit. The image capturing unit may include a camera, a scanner, or the like. In response to the electronic device deforming to a certain extent, the image capture unit may capture an image of a portion of the electronic device. The electronic device may determine its form state based on the image captured by the image capture unit.

For example, in response to an electronic device being in a folded state along its rear side, an image capture unit positioned on the rear side may capture an image. The captured image may include at least part of the rear side of the electronic device. Based on the image captured by the image capture unit, the electronic device may determine that the rear side of the electronic device is in a folded state to a certain extent.

Step 103 Determining a security level corresponding to the form state.

In some embodiments, the security level may include a security management strategy. Different security levels may include different security management policies. In certain embodiments, a security level of the electronic device may be associated with a form state of the electronic device. In one embodiment, each form state of the electronic device may correspond to one security level. In some embodiments, different form states may correspond to the same security level. In one embodiment, the electronic device may include at least two form states corresponding to different security levels.

In some embodiments, the electronic device may store a mapping relationship between form states and the security levels. In one embodiment determining the form state in Step 101 may include the electronic device determining the security level corresponding to the current form state based on the mapping relationship.

Step 104 Operating the electronic device in the security level.

In one embodiment, in response to the determination, the electronic device may operate in the determined security level. In one embodiment, operating the electronic device in the different security levels may include the electronic device operating in different ways. In one embodiment, the electronic device may display information in different ways in response to operating in different security levels. In some embodiments, the electronic device may store a large amount of information. The electronic device may receive a large amount of information. The information may include a user's private information, information the user wishes to keep confidential, or the like. The security levels of the electronic device may define whether, in which way, and to which users, the electronic device may display the information.

In one embodiment, an electronic device may include multiple of security levels. Each security level may define one or more different ways to display information. For example, a first security level of an electronic device may defines that all users may view any information on the electronic device. In response to receiving a new message (for example, a short message service (SMS) message, an email, or the like), the electronic device may display that information on the main interface, screen, or the like for a user to view. A second security level of the electronic device may define that the electronic device may classify the newly received information as confidential information and non-confidential information based on a preset information clarification rule. In response to receiving nonconfidential information (for example, in a SMS message), the electronic device may display that information on the main interface, screen, or the like to enable the user to view it. On the other hand, in response to receiving confidential information, the electronic device may notify the user of the arrival of new information, but may not display the new information on the main interface or screen. To read the confidential information, the user may need to successfully go through a certain authentication operation (for example, entering a password, or the like).

In one embodiment, the electronic device may validate an authentication operation in different ways in response to operating in different security levels. In some embodiments, to access or use some functions of the electronic device, the user may be required to perform an authentication operation. In one embodiment, a user may only use or access those functions in response to a successful validation. For example, a user making an online payment on the electronic device may require the user to input a password, fingerprint, PIN, or the like.

In one embodiment, an electronic device may include multiple security levels. Each security level may define a different validation method for the authentication operation. For example, a first security level of an electronic device may define that making an online payment requires the user to input a fingerprint. The validation may be successful only in response to the fingerprint input matching a pre-stored legitimate fingerprint.

On the other hand, a second security level of the electronic device may define that making an online payment requires the user to input both a fingerprint and a password. The validation may be successful only in response to the fingerprint input matching a pre-stored legitimate fingerprint and the password being the correct password (for example, the hash of the entered password matches the hash of a pre-stored password).

In some embodiments, an electronic device may lock its screen in response to a period of inactivity of the electronic device. In response to the user wanting to use this electronic device again, he or she may be required to first unlock the screen of the electronic device. Unlocking the screen may include an authentication operation. In one embodiment, different security levels may define different validation manners for a screen unlocking operation. For example, a security level may define that the screen of the electronic device may unlock automatically in response the user performing an input operation to the electronic device (for example, the user pressing the power button or the user touches a position on a touch-sensitive screen). Another security level may define that the user is required to input his or her fingerprint or an unlock password. The electronic device may unlock the screen in response to validating that the fingerprint matches a pre-stored legitimate fingerprint or that the password is the correct password.

In the embodiments of the present disclosure, the security management strategy may take advantage of the fact that a deformable device may have various form states such that the security management strategy of a deformable electronic device become more flexible. The user can dynamically change the security level of an electronic device by changing the form state of the electronic device. In one embodiment, determining the form state of the electronic device may include determining a transition from a first form state to a second form state. Operating the electronic device in the security level may include switching the security level from a first security level corresponding to the first form state to a second security level corresponding to the second form state. In response to detecting the change of the form state, the electronic device may switch its security level from a first security level corresponding to the first form state (the form state prior to the change of the form state) to a second security level corresponding to the second form state (the form state after the change of the form state).

In one embodiment, for example, as described above, an electronic device may unlock in different ways in response to being in different form states. For example, a smartphone may be foldable. A form state of the smartphone in response to being folded may include a second form state and the form state of the smartphone in response to not being folded may include a first form state.

The first form state may correspond to a first security level. The first security level may define that, in response to the screen of the electronic device being in a locked state, an unlocking operation may be validated only by the user performing a preset sliding operation on the unlock screen of the electronic device. A preset sliding operation may include the user sliding his or her finger on the screen in a preset pattern, location, direction, or the like. In response to the unlock operating being validated, the electronic device may unlock its screen. The second form state of the electronic device may correspond to a second security level. The second security level may define that in response to the screen of the electronic device being in a locked state, the unlocking operation may be validated only by the user inputting an unlocking password to the unlock screen of the electronic device. In response to the user inputting the correct unlocking password, the electronic device may unlock its screen.

In one embodiment, the electronic device may include a phone such as a smartphone. The smartphone may be in the first form state. The first form state may include the smartphone not being folded. The user may unlock his or her smartphone when he or she wants to use it. However, if a user wants to put his or her smartphone away and/or step away from the smartphone, he or she may fold the smartphone. The second form state may include the smartphone in a folded state in response to the user folding the smartphone, the smartphone may switch to the second security level corresponding to the second form state. In the second security level, in response to someone attempting to use this smartphone, the user may be required to input the unlocking password to unlock the smartphone. In this way, the smartphone may protect the information in the smartphone from being accessed or viewed by an unauthorized person.

In one example, an electronic device may display received information in different ways in response to the electronic device being in different form states. For example, the electronic device may be bendable. The electronic device may be in a second form state in response to being in a bent state. The bent state may include a curvature greater than a threshold value. The electronic device may include a first form state. The first form state may include the electronic device being in a bent state that may include a curvature less than the threshold value.

In one embodiment, the first form state of the electronic device may correspond to a first security level that may define that, in response to receiving information, the electronic device may notify the user with an audio sound and may display new information in a pop-up window on the main interface. The second form state of the electronic device may correspond to a second security level that may define that, in response to receiving the information, the electronic device may notify the user by displaying an unread information icon on a status bar instead of notifying the user with a voice prompt. The electronic device may not display the newly received information on the main interface.

In one embodiment, the user may form the electronic device in a first form state. In response to receiving information on the electronic device, the electronic device may display that information in a pop-up window on the main interface. The user may view the new piece of information. In one embodiment, the user may use his or her electronic device in the presence of others (for example, when more than one person is watching a movie on a tablet computer or viewing a presentation hosted on the electronic device). The user may bend the electronic device (or input a bending command in to the electronic device) such that the electronic device may be in a second form state. In response to receiving new information, the electronic device may not pop up a window to display the new information. The electronic device may prevent other users from viewing this new information and protect the user's privacy.

In some embodiments, an electronic device may include multiple form states and multiple security levels. The mapping relationship between the form states and the security levels may include a one-to-one correspondence or more than one form states may correspond to a security level.

Figure 2:
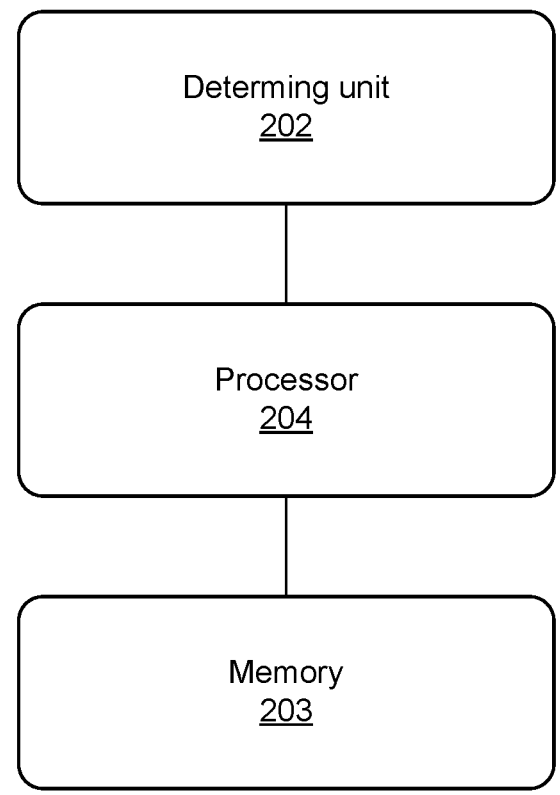
FIG. 2 is a schematic block diagram depicting one embodiment of an electronic device.

FIG. 2 depicts one embodiment of an electronic device 200. The electronic device 200 may include a determining unit 201, a memory 202, and/or a processor 203. The determining unit 201 and the memory 202 may couple to the processor 203 via a bus.

In one embodiment, the determining unit 201 may be configured to determine the form state of the electronic device 200. In some embodiments, the memory 202 may be configured to store executable code. In one embodiment, the processor 203 may be configured to execute the executable code. The processor 203 may execute the code to determine a security level corresponding to the form state and operate the electronic device 200 in the security level.

In one embodiment, the determining unit 201 may include a sensor, a chip, or the like for determining the form state of the electronic device 200. The functionality of the determining unit 201 may be integrated into the processor 203. The processor 203 may determine the form state of the electronic device 200 based on the data acquired by the determining unit 201.

The processor 203 may include one processor or a combination of more than one processor. For example, the processor 203 may include a central processing unit (CPU), an application specific integrated circuit (ASIC), or one or more integrated circuits configured for implementing the embodiments of the present invention, such as one or more digital signal processors (DSP) or one or more field programmable gate arrays (FPGA).

The memory 202 may include one memory or a combination of more than one memory. The memory 202 may store executable program code or parameters, data, or the like for operation of the electronic device 200. The memory 202 may include random access memory (RAM), or non-volatile memory (NVM) such as a disk drive, flash memory, and the like.

In some embodiments, the determining unit 201 may be configured to determine the form state of the electronic device 200. Determining the form state of the electronic device may include detecting a transition of the electronic device from a first form state to a second form state.

The code executable by the processor 203 to operate the electronic device in the security level may include switching from a first security level corresponding to the first form state to a second security level corresponding to the second form state.

In some embodiments, the code executable by the processor may include code that displays information based on the security level. For example, in one embodiment, the first security level may correspond to a first form state and a second security level may correspond to a second form state. The code executable by the processor to operate the electronic device in the security level may include code to, in response to the electronic device operating in the first security level, display the information on a main interface. The code may include code to, in response to the electronic device operating in the second security level, display a notification on the main interface.

In one embodiment, the code executable by the processor may include code to validate an authentication operation based on the security level. In some embodiments, the first security level may correspond to a first form state and a second security level may correspond to a second form state. The code executable by the processor to validate the authentication operation may include code to, in response to the electronic device operating in the first security level, access the electronic device. The code may include code to, in response to the electronic device operating in the second security level, determine that an entered password matches a pre-stored password.

In one embodiment, the electronic device may further include a deformable panel. Determining the form state of the electronic device may include obtaining an electrical parameter of the deformable panel.

The electronic device 200 may share several similarities with the method 100 described above. Therefore, from the above description, at least some the structure and implementation of the electronic device 200 may be evident for those skilled in the art.

In one embodiment, a program product is described. The program product may include a non-transitory computer readable storage medium. The storage medium may store code executable by a processor. The executable code may include code to perform determining the form state of an electronic device. The electronic device may be formable to at least one form state. The executable code may include code to perform determining a security level corresponding to the form state. The executable code may include to perform operating the electronic device in the security level.

In one embodiment, the code to perform determining the form state of the electronic device may include code to perform detecting a transition of the electronic device from a first form state to a second form state. The code to perform operating the electronic device in the security level may include code to perform switching the security level from a first security level corresponding to the first form state to a second security level corresponding to the second form state.

In one embodiment, the code executable by the processor may include code to perform displaying information based on the security level. In one embodiment, the first security level may correspond to a first form state and a second security level may correspond to a second form state. The code to perform operating the electronic device in the security level may include code to perform, in response to the electronic device operating in the first security level, displaying the information on a main interface, and in response to the electronic device operating in the second security level, displaying a notification on the main interface.

In one embodiment, the code executable by the processor may include code to perform validating an authentication operation based on the security level. In one embodiment, the first security level may correspond to a first form state and a second security level may correspond to a second form state. The code to perform operating the electronic device in the security level may include code to perform, in response to the electronic device operating in the first security level, validating the authentication operation may include accessing the electronic device. In response to the electronic device operating in the second security level, validating the authentication operation may include determining that an entered password matches a pre-stored password.

The program product may share several similarities with the method 100 and electronic device 200 described above. Therefore, from the above description, at least some the structure and implementation of the program product may be evident for those skilled in the art.

The disclosure may include various advantages and improvements. For example, an electronic device may include various form states and the electronic device may operate in different security levels based on its form state. A security management strategy of a deformable electronic device may be flexible and the user may change the security level of an electronic device by changing the form state of the electronic device.

Those skilled in the art should understand that the embodiments of the present disclosure may be embodied as a method, a system, an apparatus, a device, a computer program product, or the like. Therefore, the embodiments of the present disclosure may be in the form of a hardware-only embodiment, a software-only embodiment, or an embodiment of a combination of hardware and software. Moreover, the present disclosure may be in the form of a computer program product implemented on one or more computer usable storage media (including, but not limited to, disk storage, CD-ROM, optical storage, and the like) including computer usable program codes thereon.

The present disclosure is described with reference to the flow diagrams and/or block diagrams of methods, devices, systems, and computer program products according to the embodiments of the present disclosure. It should be understood that computer program instructions may be used to implement a process and/or block in the flow diagrams and/or block diagrams, and combinations of processes and/or blocks in the flow diagrams and/or block diagrams. The computer program instructions may be provided to a general computer, a dedicated computer, an embedded processor or other programmable data processing devices to generate a machine. The instructions, which may be executed via the processor of the computer or other programmable data processing devices, may create an implementation for the functions specified in one or more flows of the flow diagram and/or one or more blocks of the block diagram.

The computer program instructions may also be stored in a computer readable memory that can direct a computer or other programmable data processing devices to function in a particular manner. The instructions stored in the computer readable memory may produce an article of manufacture including instructions for implementing the function specified in one or more flows of the flow diagram and/or one or more blocks of the block diagram.

While some embodiments of the present disclosure have been described, variations and modifications may be made to these embodiments once the basic concepts are obtained by those skilled in the art. Thus, the attached claims are intended to be explained as including some embodiments and variations and modifications that fall within the scope of the present disclosure.

It is clear that various variations and modifications to the present disclosure may be made by those skilled in the art without departing from the spirit and scope of the present disclosure. Accordingly, if these variations and modifications to the present disclosure fall within the scope of the claims of the present disclosure and the equivalents thereof, it is also intended that the present disclosure encompass these variations and modifications.

What is claimed is:

1. A method comprising:
providing a foldable electronic computing device formable between a plurality of physical form states, wherein:
each of the plurality of physical form states is associated with a security level of a plurality of security levels and defines an active operational position of a plurality of active operational positions for the foldable electronic computing device for performing a plurality of sets of computing operations, and
each security level corresponds to a set of computing operations in the plurality of sets of computing operations;
detecting a current physical form state of the foldable electronic computing device;
determining a current security level in the plurality of security levels associated with the detected current physical form state;
determining a set of first computing operations in the plurality of sets of computing operations corresponding to the current security level; and
performing the set of first computing operations in the foldable electronic computing device corresponding to the current security level in response to a user providing an authentication operation of a plurality of authentication operations associated with the current security level,
wherein:
the plurality of security levels comprises at least a first security level associated with a first authentication operation and a second security level associated with a second authentication operation,
the first authentication operation and the second authentication operation are different authentication operations,
the first authentication operation or the second authentication operation comprises an augmented authentication operation, and
the current security level is one of the first security level and the second security level.

2. The method of claim 1, wherein:
determining the current physical form state of the foldable electronic computing device comprises detecting a transition of the foldable electronic computing device from a first physical form state to a second physical form state; and
performing the set of first operations in the foldable electronic computing device in the current security level comprises switching from the first security level corresponding to the first physical form state to the second security level corresponding to the second physical form state.

3. The method of claim 1, further comprising displaying information based on the current security level.

4. The method of claim 1, wherein:
the first security level corresponds to a first physical form state for the foldable electronic computing device;
the second security level corresponds to a second physical form state for the foldable electronic computing device; and
performing the set of first operations in the foldable electronic computing device in the current security level comprises one of:
displaying information on a main interface in response to the foldable electronic computing device performing the set of first operations in the first security level, and
displaying a notification on the main interface in response to the foldable electronic computing device performing the set of first operations in the second security level.

5. The method of claim 1, further comprising:
performing one of:
validating the first authentication operation based on the first security level, and
validating the second authentication operation based on the second security level,
wherein:
the first security level corresponds to a first physical form state;
the second security level corresponds to a second physical form state;
the second authentication operation comprises the augmented authentication operation;
validating the first authentication operation comprises determining that an entered password matches a pre-stored password, and
validating the second authentication operation comprises determining that an entered user biometric matches a pre-stored user biometric and the entered password matches the pre-stored password.

6. The method of claim 1, wherein detecting the current physical form state of the foldable electronic computing device comprises detecting an electrical parameter of a deformable panel of the foldable electronic computing device.

7. The method of claim 1, wherein:
the current security level includes the first security level; and
the method further comprises declining to perform a set of second computing operations corresponding to the second security level in response to implementing the first security level.

8. An apparatus, comprising:
a determining unit configured to determine a current physical form state of a plurality of physical form states for a foldable electronic computing device, wherein:

the foldable electronic computing device is formable between the plurality of physical form states, each of the plurality of physical form states is associated with a security level of a plurality of security levels and defines an active operational position of a plurality of active operational positions for the foldable electronic computing device for performing a plurality of sets of computing operations, and each security level corresponds to a set of computing operations in the plurality of sets of computing operations;

a processor; and a memory configured to store code executable by the processor to:

determine a current security level in the plurality of security levels associated with the current physical form state, determine a set of first computing operations in the plurality of sets of computing operations corresponding to the current security level, and perform the set of first computing operations in the foldable electronic computing device corresponding to the current security level in response to a user providing an authentication operation of a plurality of authentication operations associated with the current security level, wherein:

the plurality of security levels comprises at least a first security level associated with a first authentication operation and a second security level associated with a second authentication operation, the first authentication operation and the second authentication operation are different authentication operations, the first authentication operation or the second authentication operation comprises an augmented authentication operation, the current security level is one of the first security level and the second security level, and at least a portion of the determining unit comprises one or more of a set of hardware circuits, a set of programmable hardware devices, and executable code stored on a set of non-transitory computer-readable storage media.

9. The apparatus of claim 8, wherein:

in determining the current physical form state of the foldable electronic computing device, the determining unit is further configured to detect a transition of the foldable electronic computing device from a first physical form state to a second physical form state; and the code executable by the processor to operate the foldable electronic computing device in the current security level comprises switching from the first security level corresponding to the first physical form state to the second security level corresponding to the second physical form state.

10. The apparatus of claim 8, wherein the code executable by the processor comprises code that displays information based on the current security level.

11. The apparatus of claim 10, wherein:

the first security level corresponds to a first physical form state for the foldable electronic computing device;

the second security level corresponds to a second physical form state for the foldable electronic computing device; and the code executable by the processor to operate the foldable electronic computing device in the current security level comprises code to one of:

display the information on a main interface in response to the foldable electronic computing device operating in the first security level, and display a notification on the main interface in response to the foldable electronic computing device operating in the second security level.

12. The apparatus of claim 8, wherein:

the code executable by the processor comprises one of:

first code to validate the first authentication operation based on the first security level, and second code to validate the second authentication operation based on the second security level;

the first security level corresponds to a first physical form state;

the second security level corresponds to a second physical form state;

the second authentication operation comprises the augmented authentication operation;

the first code to validate the first authentication operation comprises code to determine that an entered password matches a pre-stored password; and the second code to validate the second authentication operation comprises code to determine that an entered user biometric matches a pre-stored user biometric and the entered password matches the pre-stored password.

13. The apparatus of claim 8, wherein:

the apparatus further comprises a deformable panel; and detecting the current physical form state of the foldable electronic computing device comprises detecting an electrical parameter of the deformable panel.

14. The apparatus of claim 8, wherein:

the current security level includes the first security level; and the memory further stores code executable by the processor to decline performing a set of second computing operations corresponding to the second security level in response to implementing the first security level.

15. A program product comprising a non-transitory computer-readable storage medium that stores code executable by a processor, the executable code comprising code to perform:

detecting a current physical form state of a plurality of physical form states for a foldable electronic computing device, wherein:

the foldable electronic computing device is formable between the plurality of physical form states, each of the plurality of physical form states is associated with a security level of a plurality of security levels and defines an active operational position of a plurality of active operational positions for the foldable electronic computing device for performing a plurality of sets of computing operations, and each security level corresponds to a set of computing operations in the plurality of sets of computing operations;

determining a current security level in the plurality of security levels associated with the detected current physical form state;

determining a set of first computing operations in the plurality of sets of computing operations corresponding to the current security level; and performing the set of first computing operations in the foldable electronic computing device corresponding to the current security level in response to a user providing an authentication operation of a plurality of authentication operations associated with the current security level, wherein:
the plurality of security levels comprises at least a first security level associated with a first authentication operation and a second security level associated with a second authentication operation,
the first authentication operation and the second authentication operation are different authentication operations,
the first authentication operation or the second authentication operation comprises an augmented authentication operation, and
the current security level is one of the first security level and the second security level.

16. The program product of claim 15, wherein:
the code to perform determining the current physical form state of the foldable electronic device comprises code to perform detecting a transition of the foldable electronic computing device from a first physical form state to a second physical form state; and
the code to perform operating the foldable electronic computing device in the current security level comprises code to perform switching from the first security level corresponding to the first physical form state to the second security level corresponding to the second physical form state.

17. The program product of claim 15, further comprising code to perform displaying information based on the current security level.

18. The program product of claim 17, wherein:
the first security level corresponds to a first physical form state for the foldable electronic computing device;
the second security level corresponds to a second physical form state for the foldable electronic computing device; and the code to perform the set of first operations in the foldable electronic computing device in the current security level comprises one of:
first code to perform displaying the information on a main interface in response to the foldable electronic computing device operating in the first security level, and
second code to perform displaying a notification on the main interface in response to the foldable electronic computing device operating in the second security level.

19. The program product of claim 15, further comprising:
code to perform one of:
validating the first authentication operation based on the first security level, and
validating the second authentication operation based on the second security level, wherein:
the first security level corresponds to a first physical form state,
the second security level corresponds to a second form state,
the second authentication operation comprises the augmented authentication operation,
validating the first authentication operation comprises determining that an entered password matches a pre-stored password, and
validating the second authentication operation comprises determining that an entered user biometric matches a pre-stored user biometric and the entered password matches the pre-stored password.

20. The program product of claim 15, wherein:
the current security level includes the first security level; and
the executable code further comprises code to perform declining to perform a set of second computing operations corresponding to the second security level in response to implementing the first security level.

* * * * *